United States Patent
Cigal (10) Patent No.: US 6,607,049 B2
(45) Date of Patent: Aug. 19, 2003

(54) QUICK DISCONNECT FOR AN INTEGRATED DRIVE UNIT

(75) Inventor: Brian P. Cigal, Fort Wayne, IN (US)

(73) Assignee: Auburn Gear, Inc., Auburn, IN (US)

( * ) Notice: Subject to any disclaimer, the term of this patent is extended or adjusted under 35 U.S.C. 154(b) by 90 days.

(21) Appl. No.: 09/801,131

(22) Filed: Mar. 6, 2001

(65) Prior Publication Data

US 2002/0125060 A1 Sep. 12, 2002

(51) Int. Cl.$^7$ .............................. B60K 17/00; F16D 11/02
(52) U.S. Cl. ...................... 180/305; 475/331; 192/69.43
(58) Field of Search ................................ 180/305, 308; 475/83, 337, 331; 192/69.43, 95, 69.91

(56) References Cited

U.S. PATENT DOCUMENTS

| | | | |
|---|---|---|---|
| 1,943,057 A | 1/1934 | Bush | 477/77 |
| 4,043,226 A * | 8/1977 | Buuck | 180/247 |
| 4,352,406 A * | 10/1982 | Fahrenschon | 180/243 |
| 4,553,914 A | 11/1985 | Noell et al. | 418/69 |
| 4,588,322 A * | 5/1986 | Shoemaker et al. | 192/95 |
| 4,599,058 A | 7/1986 | Stone | 418/221 |
| 4,610,558 A * | 9/1986 | Erickson | 192/69.43 |
| 4,692,049 A | 9/1987 | Engle | 403/1 |
| 4,811,824 A * | 3/1989 | Kurihara | 192/35 |
| 4,854,434 A * | 8/1989 | Kurihara | 192/35 |
| 4,928,804 A * | 5/1990 | Wakabayashi | 180/247 |
| 5,261,801 A | 11/1993 | Stone | 418/69 |
| 5,267,915 A * | 12/1993 | Estabrook | 475/269 |
| 5,370,511 A | 12/1994 | Strikis et al. | 418/6 |
| 5,398,776 A * | 3/1995 | Forster | 180/247 |
| 5,520,272 A * | 5/1996 | Ewer et al. | 192/36 |
| 5,597,058 A * | 1/1997 | Ewer | 180/247 |
| 5,743,144 A | 4/1998 | Krantz | 74/405 |
| 5,899,307 A * | 5/1999 | Zaun et al. | 192/114 R |
| 2001/0035012 A1 * | 11/2001 | Smith | 60/435 |
| 2002/0112934 A1 * | 8/2002 | Karambelas et al. | 192/69.43 |

* cited by examiner

*Primary Examiner*—Paul N. Dickson
*Assistant Examiner*—Laura B. Rosenberg
(74) *Attorney, Agent, or Firm*—Baker & Daniels (57) ABSTRACT

A disconnect mechanism for a drive unit (e.g., a wheel drive unit or an integrated drive unit) including a wheel carrying hub rotatably attached to a frame and a reciprocal input shaft operable to selectively connect a power source (e.g., a hydraulic motor) to a transmission connected to the hub. The disconnect mechanism is connected to the input shaft and is adapted to be selectively hand actuated. The disconnect mechanism includes a hand rotatable knob rotatably connected to a cover removably attached to and enclosing an end of the hub. The knob includes an annular helical surface (i.e., ramp surface) operable to axially displace the input shaft from a first position in which the input shaft is drivingly connected to the transmission and, thus, the hub to a second position in which the input shaft is disconnected from the transmission. A disconnect pin is positioned intermediate the disconnect knob and the input shaft and rides on the ramp surface of the disconnect knob. A resilient member biases the input shaft into continuous contact (via the disconnect pin) with the ramp surface of the disconnect knob.

15 Claims, 7 Drawing Sheets

FIG_2

FIG_9

FIG_10

QUICK DISCONNECT FOR AN INTEGRATED DRIVE UNIT

BACKGROUND OF THE INVENTION

1. Field of the Invention

The present invention relates to a drive unit (e.g., an integrated drive unit, or a wheel drive unit), and, more specifically, to an improved drive unit including an improved disconnect device for selectively disengaging the input shaft from the gear reduction train to allow the gear reduction train to freewheel.

2. Description of the Related Art

Wheel drive units include a single housing having a transmission connectable to a power source mounted exterior of the housing. In one known wheel drive unit, a sleeve is utilized to link a power source to an input shaft selectively drivingly engaged with the transmission. In some configurations, the wheel drive unit is configured to accommodate axial displacement of the input shaft to allow the input shaft to be disengaged from the transmission so that the wheel drive unit will freewheel.

Integrated drive units include a single housing containing both a power input device and a transmission. The power input device can be, e.g., a hydraulic motor. In one known integrated drive unit, the hydraulic motor is linked to the transmission of the integrated drive unit via an output shaft (drivingly engaged with the motor) coupled to an input shaft (selectively drivingly engaged with the transmission). In some configurations, the integrated drive unit is configured to accommodate axial displacement of the input shaft to allow the input shaft to be disengaged from the transmission so that the integrated drive unit will freewheel. For the purposes of this document, "drive unit" generically refers to either a wheel drive unit or an integrated drive unit.

One known drive unit utilizes an externally positioned cover or "hat" to position the input shaft in either an engaged or a disengaged position. The hat includes a protrusion having a hollow interior sized to accommodate a plunger pin which abuts the input shaft. When the input shaft is engaged with the transmission, the hat is positioned with its protrusion facing outwardly from the integrated drive unit, with the plunger pin positioned in the hollow interior of the hat-shaped disconnect cover. The disconnect device is typically secured to the drive unit via a screw or other conventional fastener. To disengage the input shaft from the transmission, the fastener is removed so that the hat may be reversed (i.e., rotated 180°) such that the protrusion extends toward the integrated drive unit and axially displaces the plunger pin and, consequently, the input shaft, thereby disengaging the input shaft from the transmission. After repositioning the hat, the fastener is replaced so that the drive unit is maintained in its freewheel configuration. This disconnect mechanism requires the use of tools for placing the drive unit in its freewheel configuration. Utilizing a hat mechanism of this type requires the location of the appropriate tool to remove the fastener holding the hat in place and is relatively tedious to perform.

Prior art disconnect mechanisms typically extend past the hub of the drive unit and are, therefore, particularly susceptible to damage and inadvertent contact by external influences, such as rocks, mud and vegetation, for example. These influences can bind the disconnect mechanism and create an impediment to proper disconnect operation. Mechanisms of this type utilize axially exerted force (with respect to the input shaft) to effect disconnection and can be difficult to operate.

What is needed in the art is a disconnect mechanism for use with a drive unit which disconnect mechanism is quick and easy to utilize without requiring the use of tools.

What is further needed in the art is a disconnect mechanism for use with a drive unit which provides an operator with tactile indication of engagement and disengagement of the transmission.

What is additionally needed in the art is a disconnect mechanism for use with a drive unit that is protected from external influences such as, e.g., rocks, mud, and vegetation.

SUMMARY OF THE INVENTION

The foregoing shortcomings of the prior art are addressed and overcome by the present invention. The present invention provides a rotating disconnect knob having an annular helical surface (i.e., ramp surface) for placing the input shaft of a drive unit in either an engaged or a disengaged position with respect to the transmission. The disconnect knob of the current invention is manually actuatable and provides a quick and easy mechanism for placing a drive unit in a freewheel configuration.

The rotating disconnect knob of the present invention is applicable to an integrated drive unit including a fixed spindle and a rotatable hub connected to a wheel. The integrated drive unit includes a drive mechanism (e.g., hydraulic motor) for selectively driving the hub, and an output/input shaft combination for transmitting power output from the drive mechanism to power input to the transmission. The output/input shaft combination comprises an output shaft rotatably fixed to an input shaft such that relative axial movement may be effected. The input shaft is selectively axially displaceable from a first position in which the input shaft is drivingly connected to the hub (via the transmission) to a second position in which the input shaft is disconnected from the transmission, and, thus, the hub. The annular helical, or ramped surface of the disconnect knob is operable to axially displace the input shaft between the first and the second positions. In one exemplary embodiment, the rotating disconnect knob of the present invention contacts the input shaft via a plunger pin. In this embodiment, the disconnect knob includes an engage detent and a disengage detent for signaling achievement of the first and second positions of the disconnect knob, respectively. The disengage knob is positioned within a counterbore formed in the hub, and is thereby generally protected from external influences such as, e.g., rocks, mud, and vegetation.

The rotating disconnect knob of the present invention is equally applicable to a wheel drive unit including a fixed spindle and a rotatable hub connected to a wheel. The wheel drive unit generally includes a sleeve for selectively connecting an input shaft to a power source mounted outside the wheel drive unit housing. The input shaft is axially displaceable relative to the sleeve from a first position in which the input shaft is drivingly connected to the hub (via the transmission) to a second position in which the input shaft is disconnected from the transmission, and, thus, the hub. As in the case of an integrated drive unit, the annular helical, or ramped surface of the disconnect knob is operable to axially displace the input shaft between the first and the second positions.

The invention, in one form thereof, comprises a drive unit including a fixed spindle connectable to a vehicle and a rotatable hub connected to a wheel. In this form of the current invention, the drive unit comprises a gear set operable to be selectively driven by a power source, with the hub selectively operably coupled to the power source through the gear set; an input shaft for selectively connecting the power source to the gear set, with the input shaft being selectively axially displaceable from an engaged position in which the input shaft is drivingly engaged with the gear set to a disengaged position in which the input shaft is disengaged from the gear set. An actuatable ramped surface is connected to the input shaft so that actuation of the ramped surface operates to axially displace the input shaft between the engaged and disengaged positions.

The invention, in another form thereof, comprises a method of placing a drive unit in a freewheel position, wherein the drive unit includes a fixed spindle and a rotatable hub connected to a wheel; the drive unit further includes a gear set selectively driven by a power source, with the hub selectively operably coupled to the power source through the gear set; an input shaft for selectively connecting the power source to the gear set; wherein the input shaft is selectively axially displaceable from an engaged position in which the input shaft is drivingly engaged with the gear set to a disengaged position in which the input shaft is disengaged from the gear set; and an actuatable ramped surface connected to the input shaft, whereby actuation of the ramped surface operates to axially displace the input shaft between the engaged and the disengaged positions; said method comprising the step of: actuating the ramped surface.

An advantage of the present invention is the ability to place a drive unit in a freewheel configuration without the use of tools.

Another advantage of the present invention is the provision of a manually operable mechanism for placing a drive unit in a freewheel condition, which manually operable mechanism includes tactile feedback indicative of the freewheel condition.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated to better illustrate and explain the present invention. The exemplifications set out herein illustrate exemplary embodiments of the present invention and such exemplifications are not to be construed as limiting the scope of the invention in any manner.

DETAILED DESCRIPTION OF THE INVENTION

Figure 1A:
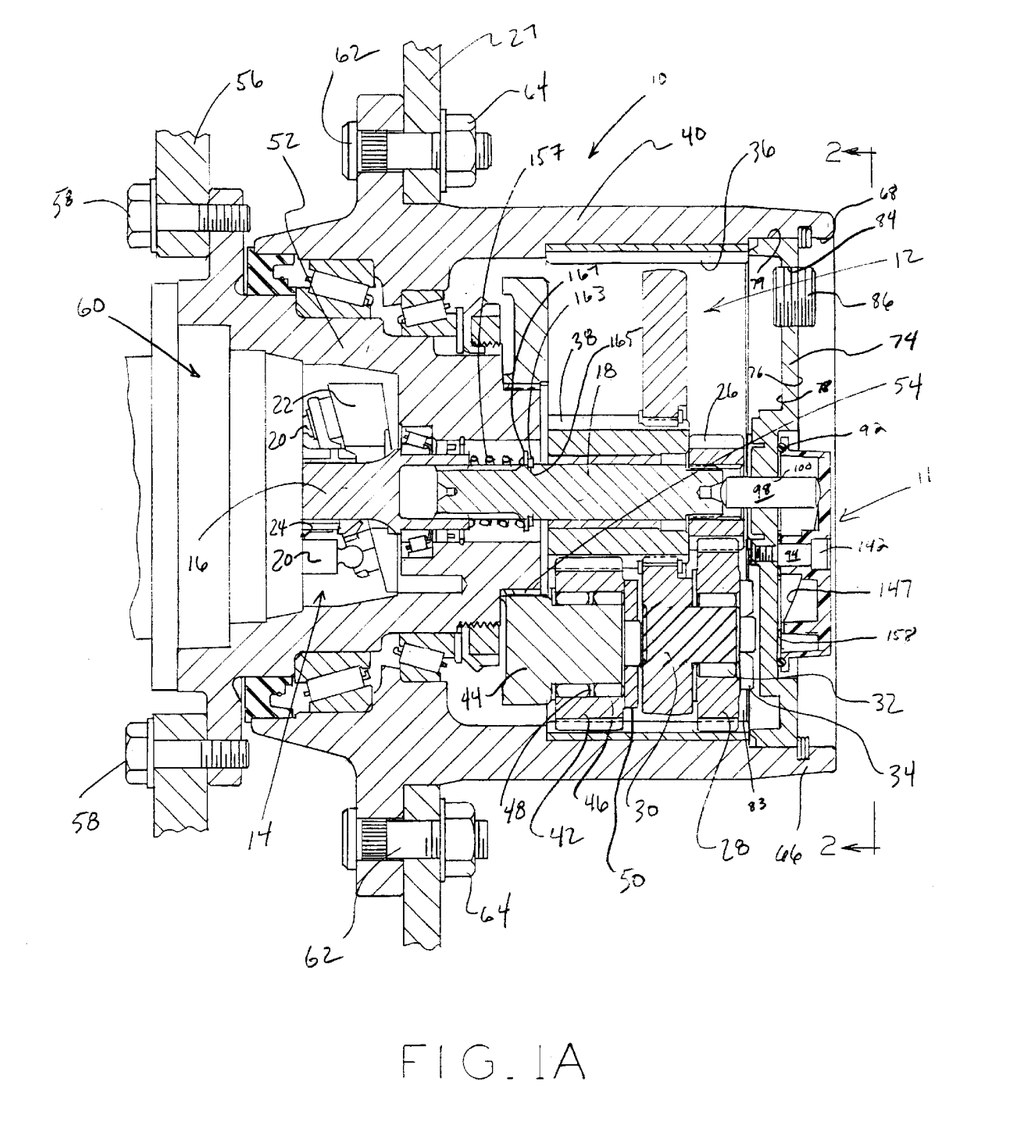
FIG. 1A is a partial sectional view of an integrated drive unit including a rotating disconnect knob in accordance with the present invention.

Referring now to the drawings and particularly to FIG. 1A, an exemplary embodiment of an integrated drive unit in accordance with the present invention is illustrated. Integrated drive unit 10 includes transmission 12 and hydraulic motor 14. Hydraulic motor 14 is selectively connectable, in driving relationship, to transmission 12 via motor output shaft 16 and input shaft 18. Input shaft 18 is selectively disengageable from transmission 12 via disconnect mechanism 11 as will be further described hereinbelow.

Figure 1B:
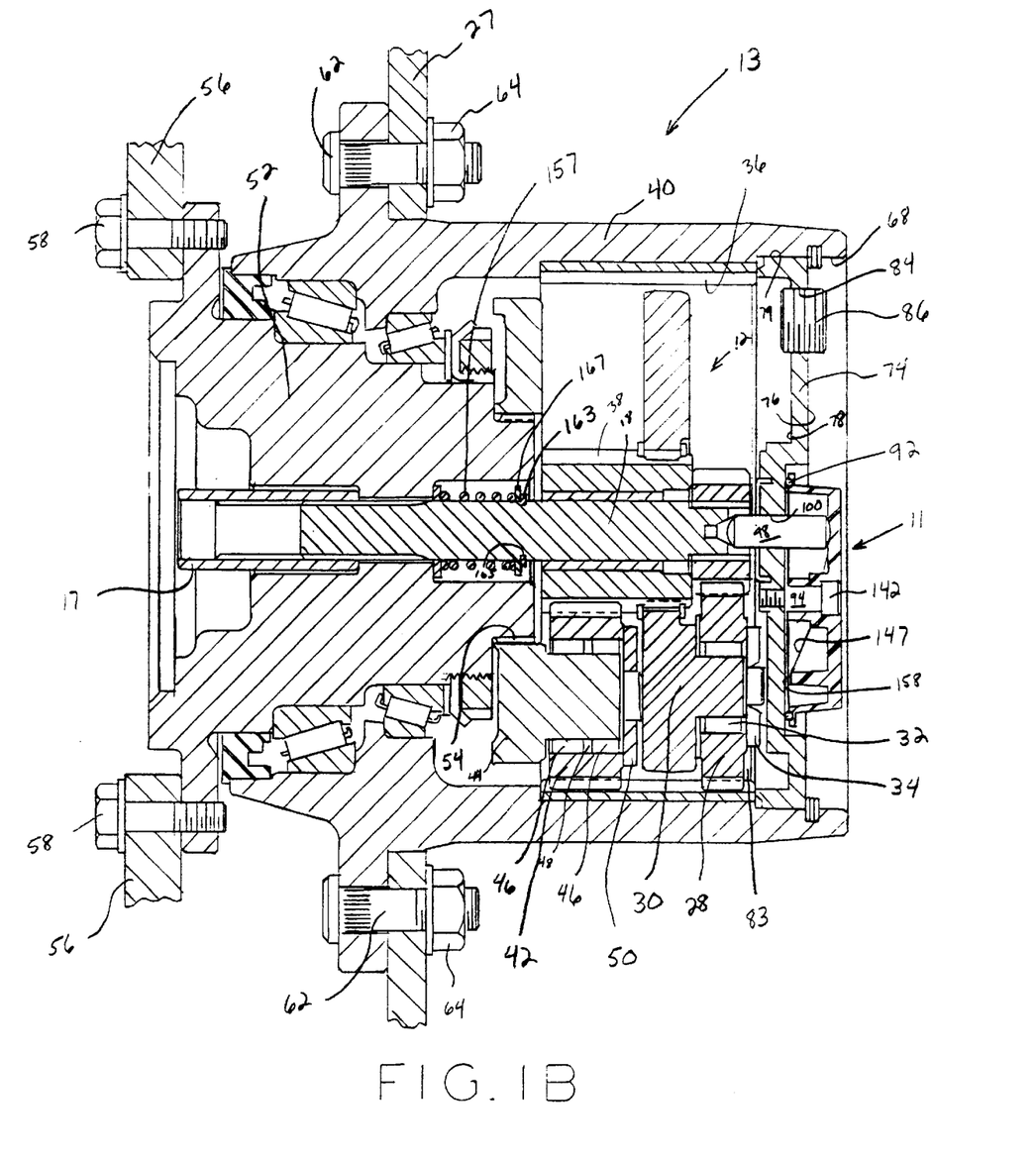
FIG. 1B is a partial sectional view of a wheel drive unit including a rotating disconnect knob in accordance with the present invention.

Referring now to FIG. 1B, an exemplary embodiment of a wheel drive unit in accordance with the present invention is illustrated. Wheel drive unit 13 includes transmission 12, input shaft 18, and sleeve 17. Sleeve 17 is operable to selectively connect transmission 12 (via input shaft 18) to a power source. Sleeve 17 is splined to input shaft 18, and, in use, will be rotationally fixed to and driven by a power source. Input shaft 18 is selectively disengageable from transmission 12 via disconnect mechanism 11 as will be further described hereinbelow. The remainder of this detailed description will refer to integrated drive unit 10 illustrated in FIG. 1A, however, the disconnect mechanism of the present invention is equally applicable to wheel drive unit 13 illustrated in FIG. 1B. Wheel drive unit 13 generally differs from integrated drive unit 10 only in that wheel drive unit 13 does not house a power source (e.g., a hydraulic motor). With this in mind, the corresponding parts of wheel drive unit 13 and integrated drive unit 10 are indicated with consistent reference numerals and the operation of wheel drive 13 is not separately described for the sake of brevity.

Referring again to FIG. 1A, hydraulic motor 14 is in fluid communication with a hydraulic pump (not shown) installed in a vehicle (not shown) onto which the integrated drive unit, or a plurality of integrated drive units are installed. Motor pistons 20 are hydraulically actuated by the hydraulic pump and function in conjunction with swash plate 22 to provide rotary motion to hydraulic motor barrel 24 as is known in the art. Hydraulic motor barrel 24 is splined to motor output shaft 16. Motor output shaft 16 is further splined to input shaft 18, and input shaft 18 is selectively splined to primary sun gear 26. In this way, rotary motion of hydraulic motor barrel 24 can be transmitted into rotary motion of primary sun gear 26.

Primary sun gear 26 is in toothed engagement with primary planet gear 28. While only one primary planet gear 28 is illustrated in FIG. 1, multiple primary planet gears (e.g., three or four) can be utilized. Primary planet gear 28 is rotatably supported by primary planet carrier 30, with bearing 32 interposed therebetween. Retaining washer 34 is affixed to primary planet carrier 30 and resists axial movement of primary planet gear 28. Ring gear 36 is press fit to hub 40 and is in toothed engagement with primary planet gear 28. Rotation of primary sun gear 26 causes rotational movement of primary planet gear 28 about ring gear 36, and consequently, rotational movement of primary planet carrier 30. Primary planet carrier 30 is in splined engagement with secondary sun gear 38. Secondary sun gear 38 includes a clearance hole through which input shaft 18 passes. Secondary sun gear 38 is in toothed engagement with secondary planet gears 42. Again, while only one secondary planet gear 42 is illustrated in FIG. 1, multiple secondary planet gears (e.g., 3 or 4) can be utilized.

Secondary planet gears 42 are rotatably supported by secondary planet carrier 44, with bearings 46 interposed therebetween. Separation washer 48 is placed between axially aligned sets of bearings 46, while retaining washer 50 is affixed to secondary planet carrier 44 and resists axial movement of each secondary planet gear 42. Secondary planet carrier 44 is splined to spindle 52 at location 54, and spindle 52 is affixed to frame 56 of the vehicle (not shown) via bolts 58. Secondary planet carrier 44 is stationary relative to the vehicle frame and therefore rotational movement of secondary planet gears 42 causes rotational movement of ring gear 36 and consequently hub 40 to which ring gear 36 is affixed. Hub 40 is affixed to wheel 27 via bolts 62 and nuts 64, and therefore, rotational movement of ring gear 36 is translated into rotational movement of wheel 27. Integrated drive unit 10 includes a brake mechanism depicted generally at 60. The structure of an applicable brake mechanism is disclosed in U.S. Provisional Patent Application No. 60/192,909, filed Mar. 29, 2000, assigned to the assignee of the present invention, the disclosure of which is herein explicitly incorporated by reference.

Figure 2:
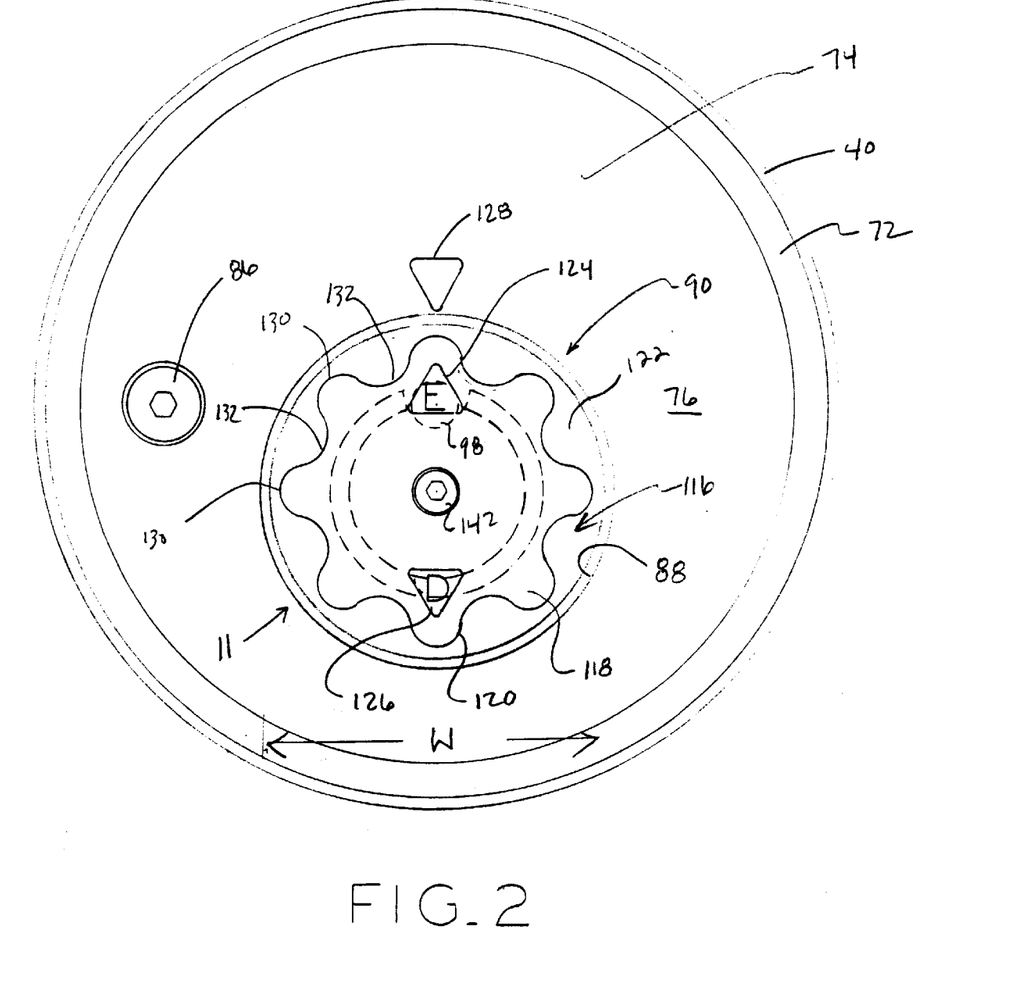
FIG. 2 is a plan view of the disconnect mechanism taken along line 2—2 of FIG. 1.
Figure 3:
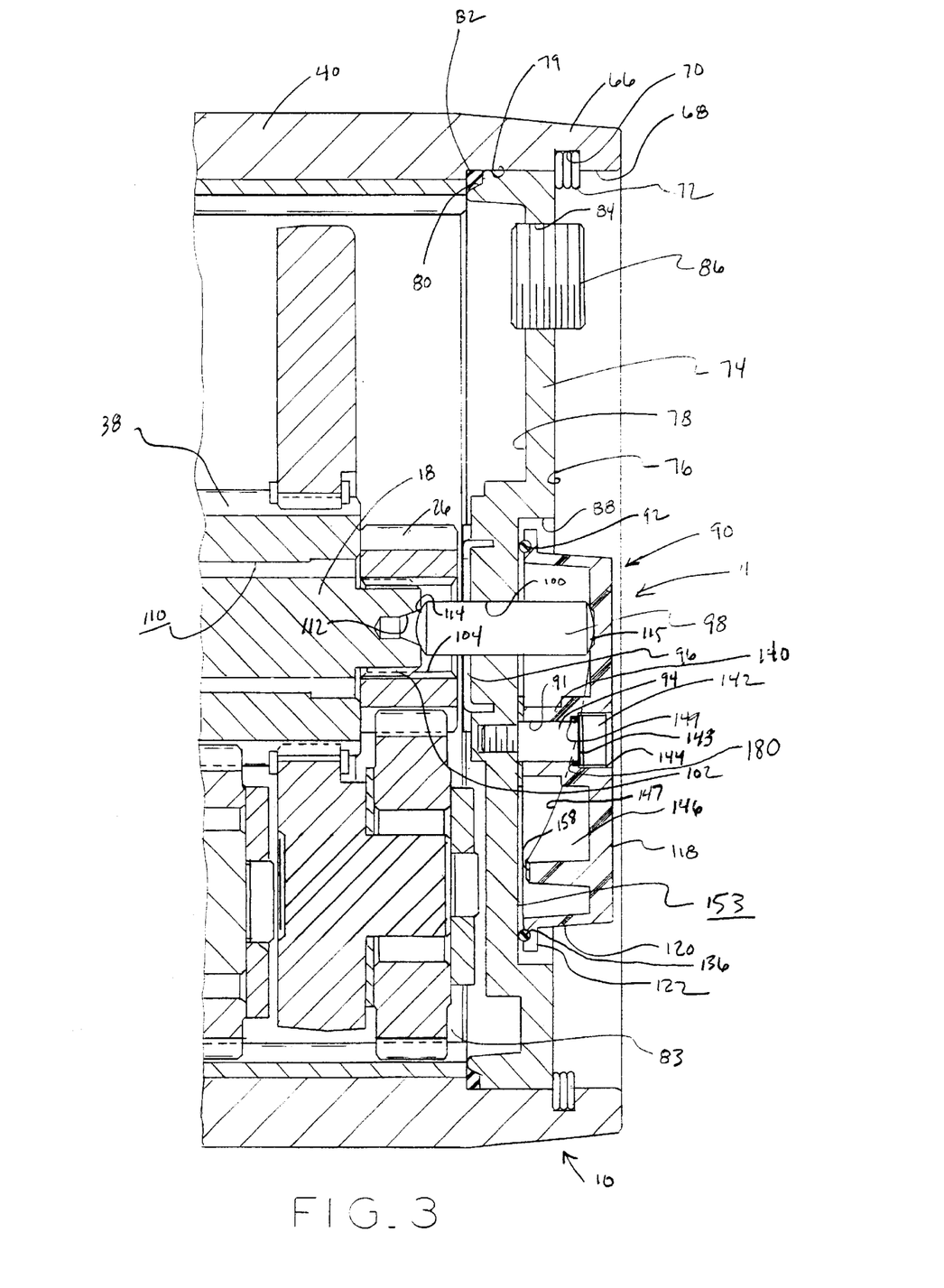
FIG. 3 is a partial sectional view of the integrated drive unit of FIG. 1.

Referring to FIGS. 1A, 2, and 3, integrated drive unit 10 includes disconnect mechanism 11 recessed within hub 40. Hub 40 includes end 66 having counterbore 68 with retaining ring groove 70 formed therein to receive a conventional coil-type retaining ring 72. Retaining ring 72 secures cover 74 within counterbore 68 of hub 40. Cover 74 includes outer surface 76, inner surface 78 and peripheral surface 79. Cover 74 is substantially U-shaped in cross section, having a cupped portion facing inwardly toward input shaft 18 within hub 40. Peripheral surface 79 of cover 74 includes seal groove 80 in which seal 82 is positioned to seal cover 74 to hub 40. Seal 82 is, e.g., an elastomeric ring. Cover 74 includes drain hole 84 with oil plug 86 positioned therein. Hub 40 includes inner hub cavity 83 which is at least partially filled with lubricant, e.g., oil, to lubricate transmission 12. Lubricant may be drained from, or added to inner hub cavity 83 via drain hole 84 in cover 74.

As illustrated, e.g., in FIGS. 2 and 3, cover 74 includes eccentrically positioned recess 88 sized to accommodate rotatable disengage knob 90. Referring now to FIG. 3, knob 90 is rotatably attached to cover 74 by fastener 94. Fastener 94 traverses aperture 91 in knob 90 and is threadably engaged with cover 74 such that knob 90 is rotatably attached to cover 74. Cover 74 includes centrally located through hole 100 which reciprocally supports disconnect pin 98 extending therethrough. Embedded washer 96 is fixed to inner surface 78 of cover 74 to protect cover 74 from damage due to adjacently positioned sun gear 26 and to discourage axial displacement of sun gear 26. Knob 90 is fitted with O-rings 92, 149 to prevent lubrication from escaping inner hub cavity 83 through aperture 100 in cover 74.

Rotation of knob 90 causes axial displacement of disconnect pin 98 to disengage or engage moveable input shaft 18 from sun gear 26, as further described hereinbelow. Referring to FIG. 3, input shaft 18 includes external splines 102 operable to engage splines 104 of sun gear 26. Input shaft 18 traverses clearance hole 110 in secondary sun gear 38 and is axially displaceable relative thereto. Disconnect pin 98 includes a pair of opposing rounded ends 114, 115. End 114 abuts piloting counterbore 112 in input shaft 18, while end 115 abuts knob 90.

Figure 6:
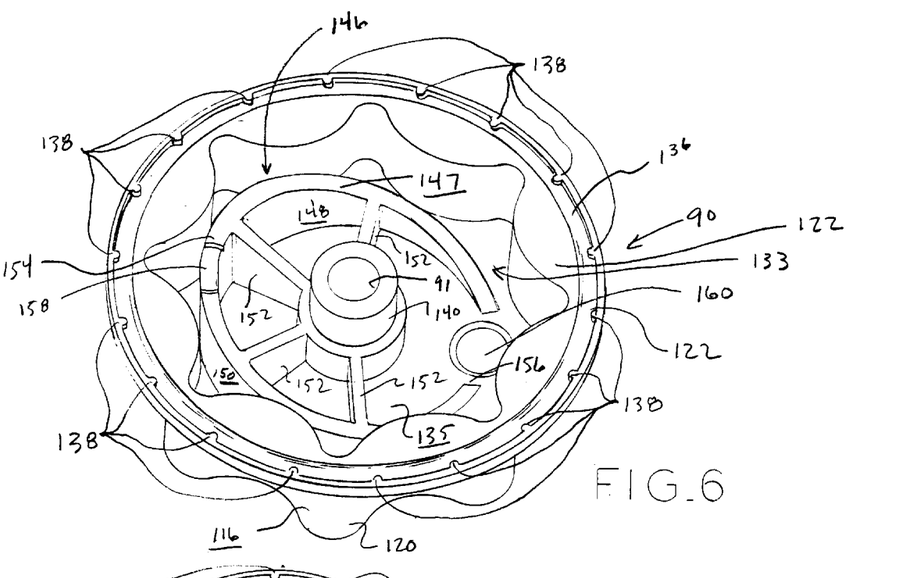
FIG. 6 is a perspective view of a first embodiment of the rotating disconnect knob of the present invention.

As illustrated in FIG. 2, knob 90 includes outer portion 116 including base 122 (FIG. 3) connected by outer wall 120 to top portion 118 having a periphery formed by alternating convex portions 130 and concave portions 132. As illustrated in FIG. 2, outer wall 120 follows the periphery of top portion 118 to form a plurality of protrusions corresponding to convex portions 130 (FIG. 6). As illustrated in FIG. 2, knob 90 includes a first raised triangular portion embossed with the letter "E" to form engage indicator 124. Similarly, knob 90 includes second raised triangular portion embossed with the letter "D" to form indicator 126. Cover 74 includes a raised triangular portion forming indicator 128 which aligns with raised portions 124, 126, respectively, when the integrated drive unit is in the engaged or disengaged position. As described above, outer wall 120 includes alternating convex portions 130 and concave portions 132. This construction of outer wall 120 provides an operator with a utilitarian gripping structure to facilitate hand rotation of knob 90. Specifically, the protrusions in outer wall 120 corresponding to convex portions 130 provide structure against which a tangential force can be applied to rotate knob 90. In one exemplary embodiment, knob 90 has width "W" (FIG. 2) measuring 3¼ inches.

Figure 5:
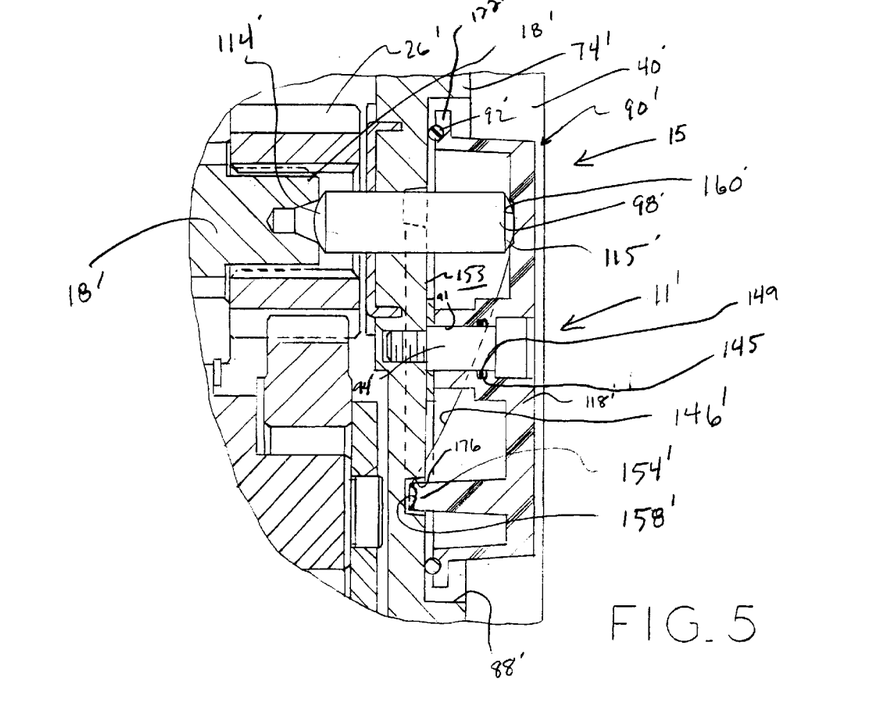
FIG. 5 is a partial sectional view of the integrated drive unit of FIG. 1 illustrating the embodiment of the disconnect input shaft engaged with the transmission.
Figures 7, 8:
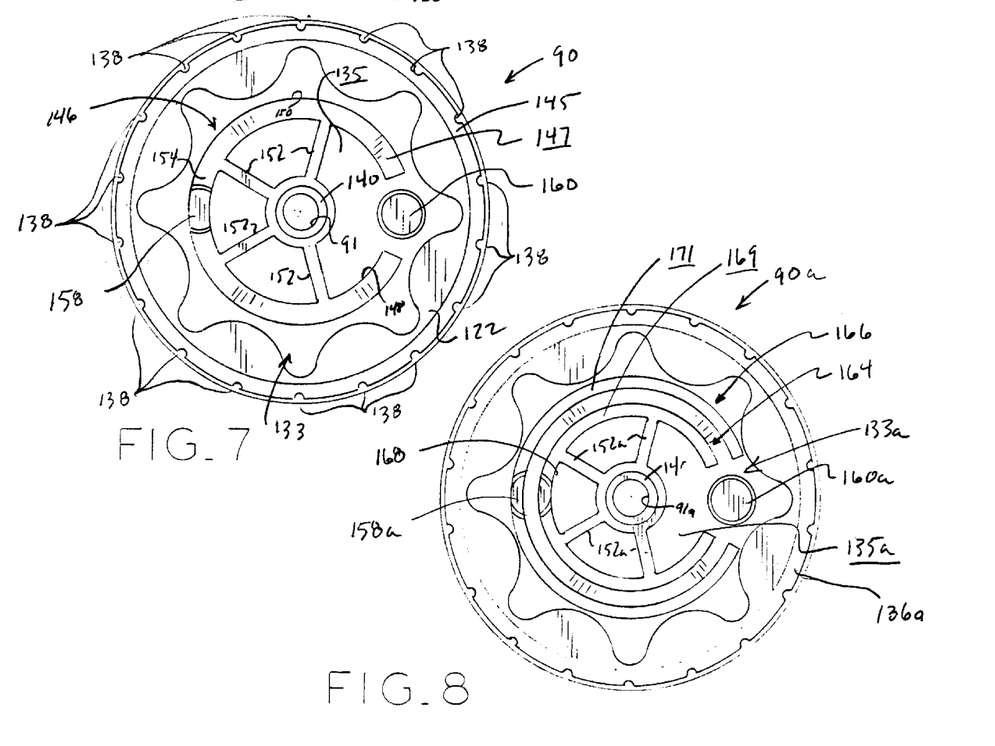
FIG. 7 is a plan view thereof.
FIG. 8 is a plan view of a second embodiment of the rotating disconnect knob of the present invention.

Referring to FIGS. 6 and 7, knob 90 includes inner portion 133, with ramp 146 extending from planar floor 135 of knob 90. Ramp 146 engages disconnect pin 98 and is operable to effect axial displacement of disconnect pin 98 as will be further described herein below. O-ring groove 136 is provided at the periphery of base 122. Circumferentially arranged ribs 138 are positioned within O-ring groove 136 and are spaced about the periphery of base 122. Ribs 138 provide discrete "pinch" points along the circumference of O-ring 92 (FIG. 3) and thereby function to retain O-ring 92 in O-ring groove 136 and to prevent rotation of O-ring 92 relative to knob 90. Boss 140 is centrally located within inner portion 133 and includes elongate aperture 91 sized to accommodate fastener 94 (FIG. 3) for rotatably supporting knob 90 as described above. Referring to FIG. 3, counterbore 144 in knob 90 accommodates head 142 of fastener 94. Positioned intermediate aperture 91 and counterbore 144 is intermediate counterbore 180 having O-ring 149 positioned therein (FIG. 5). Washer 143 may be provided between head 142 of fastener 94 and intermediate counterbore 180 to retain O-ring 149 within intermediate counterbore 180. O-rings 92, 149 prevent oil in hub cavity 83 from escaping through aperture 100 in cover 74. In another embodiment (illustrated in FIG. 5), O-ring 149 is positioned within groove 145 formed in elongate aperture 91 of knob 90.

As illustrated in FIG. 6, inner portion 133 of knob 90 includes helical annular ramp 146. Annular ramp 146 includes ramped surface 147 and inner and outer wall surfaces 148 and 150, respectively. Ribs 152 are attached to inner wall surface 148 and extend inwardly therefrom to centrally located boss 140. Advantageously, ribs 152 increase the structural integrity of knob 90 and decrease the likelihood that knob 90 will lift away from surface 153 (FIG. 3) of cover 74 in response to rotation of knob 90 and the consequent axial force applied to disconnect pin 98. Therefore, ribs 152 decrease the likelihood of a fluid leak along O-ring 92 when knob 90 is actuated.

As illustrated in FIG. 6, ramp 146 includes pinnacle 154 and base 156 (FIGS. 6–7). Pinnacle 154 and base 156 are separated by approximately 180° on annular ramp 146. Referring to FIG. 3, ramped surface 147 of annular ramp 146 provides a bearing surface for end 115 of disconnect pin 98. Ramped surface 147 acts against disconnect pin 98 to axially displace input shaft 18 as is further described hereinbelow. Input shaft 18 and ramped surface 147 remain in contact with disconnect pin 98 due to the biasing force of spring 157 (FIG. 1).

Referring to FIG. 1A, retaining ring 163 is engaged in groove 165 formed in input shaft 18. Washer 167 abuts retaining ring 163 and provides support for one end of compression spring 157. The opposing end of spring 157 abuts motor output shaft 16 (in the wheel drive unit embodiment illustrated in FIG. 1B, the opposing end of spring 157 abuts a washer placed about, but not secured to input shaft 18). Spring 157 biases input shaft 18 toward cover 74. If an operator rotates knob 90 toward the disengaged position, the biasing force of the spring must be overcome to inwardly displace input shaft 18. Similarly, if an operator rotates knob 90 toward the engaged position, the biasing force of spring operates to axially displace input shaft 18 into the engaged position illustrated, e.g., in FIG. 3.

Figure 4:
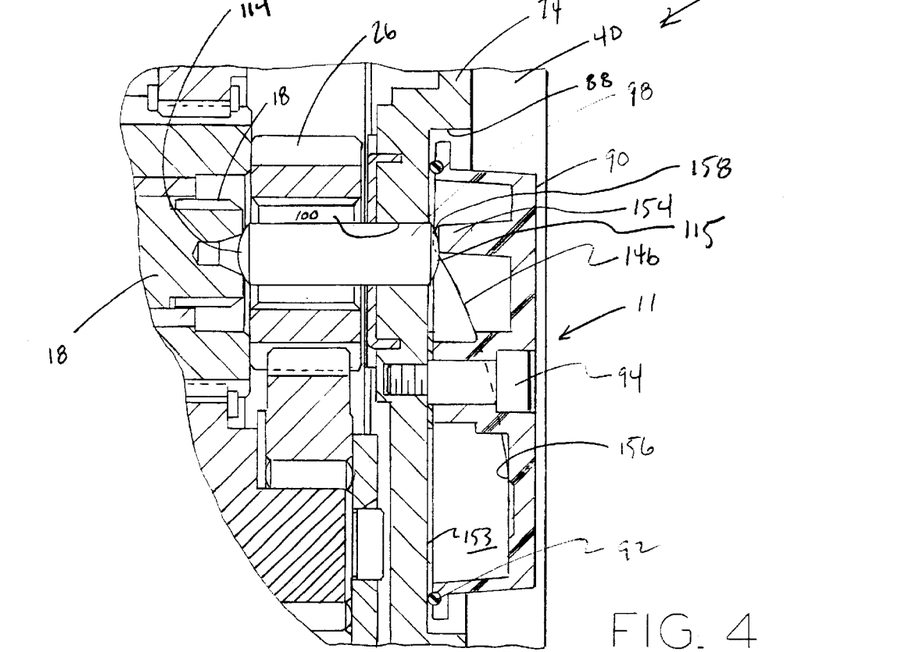
FIG. 4 is a partial sectional view of the integrated drive unit of FIG. 1 illustrating the integrated drive unit in a disengaged (i.e., freewheel position)

FIG. 4 illustrates knob 90 rotated into the disengaged position corresponding to disengage indicator 126 (FIG. 2) being aligned with indicator 128 on cover 74 (corresponding to an 180° rotation of knob 90 from the position illustrated in FIG. 2). The disengage position corresponds to disconnect pin 98 abutting pinnacle 154 of ramped surface 147. Detent 158 at pinnacle 154 provides a mechanism for retaining disconnect pin 98 in the disengaged position, as is further discussed hereinbelow. Similarly, FIG. 3 illustrates disconnect knob 90 positioned in the engaged position (also illustrated in FIG. 2) with disconnect pin 98 being positioned at base 156 of ramped surface 147. Detent 160 is positioned at base 156 of ramped surface 147 and functions to retain disconnect pin 98 in the engaged position.

Axial displacement of disconnect pin 98 is effected by rotation of knob 90. Rotation of knob 90 causes disconnect pin 98 to ride on ramped surface 147 and thereby be axially displaced into one of its engaged and disengaged positions. As described above, spring 157 biases input shaft 18 into abutting relationship with disconnect pin 98 and thereby facilitates displacement of input shaft 18 from its disengaged position to its engaged position. Detents 158, 160 are opposite indicators 126, 124 of knob 90, respectively, whereby engaged indicator 124 is aligned with indicator 128 on cover 74 when disconnect pin is positioned within detent 160 (at base 156 of ramped surface 147). Similarly, disengage indicator 126 is aligned with indicator 128 on cover 74 when disconnect pin 98 is positioned within detent 158 (at pinnacle 154 of ramped surface 147).

In one exemplary embodiment, knob 90 is manufactured from a fiber-reinforced Nylon copolymer such as, e.g., Grivory GV-6H manufactured by, e.g., EMS-American Grilon Inc., Sumter, S.C., 29151. Grivory GV-6H has a Shore D hardness of 91. Generally, knob 90 will be constructed from a rigid and durable material having a generally high resistance to lubricants. Advantageously, knob 90 may be formed from an injection moldable material to facilitate manufacture thereof. Cover 74 may also be formed from Grivory GV-6H, or another suitable fiber-reinforced Nylon copolymer.

Referring to FIGS. 6–7, pinnacle 154 of ramped surface 147 includes detent 158. Detent 158 is operable to "lock" disconnect pin 98 in the disengaged position as briefly described supra. Specifically, end 115 (FIG. 3) of disconnect pin 98 is retained within detent 158 to retain the disengaged position as illustrated in FIG. 4. In operation, detent 158 provides an operator with tactile indication of disengagement. Similarly, base 156 of ramped surface 147 includes detent 160. Detent 160 is operable to "lock" disconnect pin 98 in the engaged position. In the engaged position, end 115 (FIG. 3) of disconnect pin 98 is retained within detent 160 to retain disconnect knob 90 in the engaged position. Similar to detent 158, detent 160 provides an operator with tactile indication of engagement.

A number of alternative embodiments of disconnect knob 90 will now be described. Common elements of the various embodiments of the disconnect knob will be denoted with reference numerals having a letter appended thereto, and many of these common elements will not be specifically referred to for the sake of brevity. FIG. 8 illustrates knob 90a in accordance with an alternative embodiment of the present invention. Rather than a single ramp (146) as illustrated in FIGS. 6–7, knob 90a includes a pair of ramps 164, 166, having ramped surfaces 169, 171, respectively. Ramps 164, 166 are substantially concentric and are spaced whereby end 115 (FIG. 3) of disconnect pin 98 contacts both ramped surfaces 169, 171. Both ramps 164 and 166 extend from floor 135a of base 122 (FIG. 2). Ribs 152a are attached to inner wall surface 168 of ramp 164 and extend inwardly to centrally located boss 140a. It is contemplated that additional ribs may extend between ramps 164, 166. Detent 158a of knob 90a differs from detent 158 of knob 90 (FIGS. 6–7) in that it is formed in both ramps 164, 166.

Figure 9:
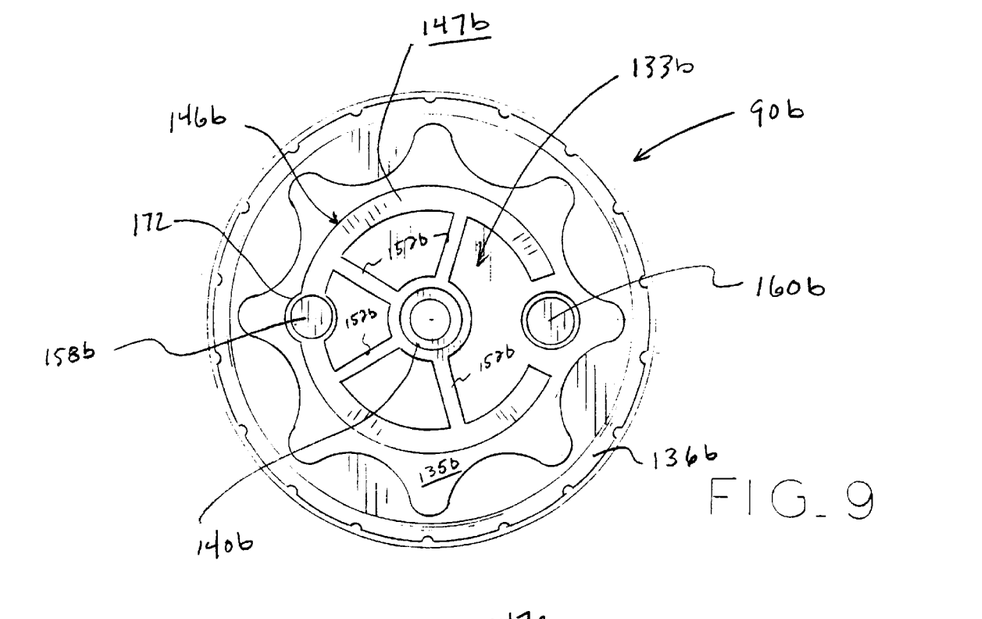
FIG. 9 is a plan view of a third embodiment of the rotating disconnect knob of the present invention.

A third embodiment of a knob 90b according to the present invention is illustrated in FIG. 9 and differs from the first embodiment knob 90 (FIGS. 6–7) in that ramp 146b intersects column portion 172. Detent 158b is formed in column portion 172 and overlays end 115 of disconnect pin 98 (in the disengaged position) such that the force generated by contact between end 115 of disconnect pin 98 and detent 158b is substantially uniformly transferred therebetween. Ramp 146b includes ramped surface 147b to provide a bearing surface for end 115 of disconnect pin 98. Ramped surface 147b is operable to displace input shaft 18 as described hereinabove with respect to knob 90 illustrated, e.g., in FIG. 6.

Figure 10:
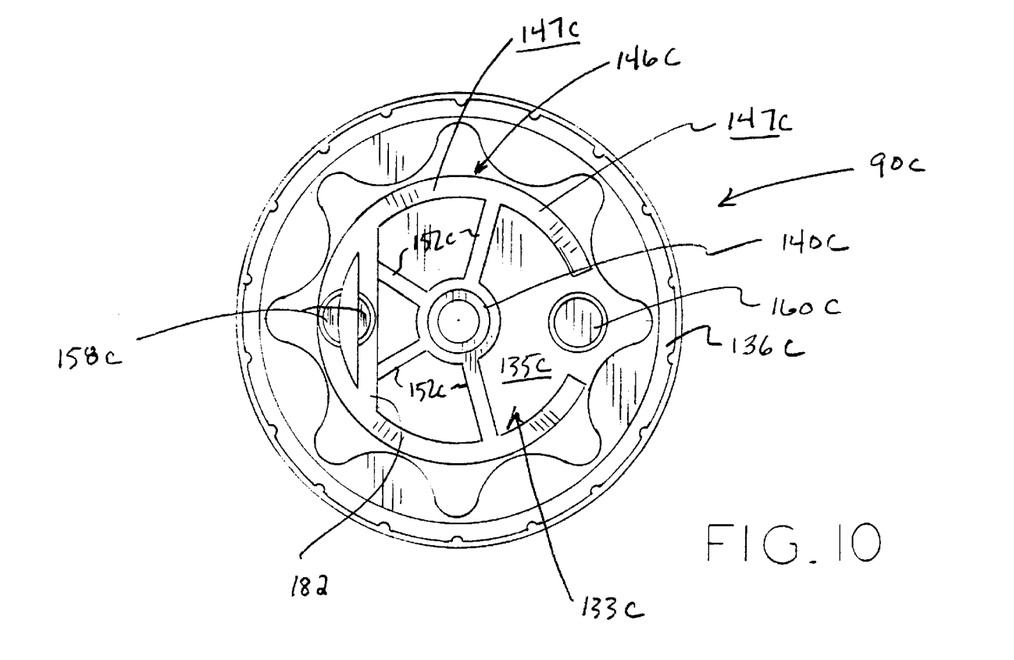
FIG. 10 is a plan view of a fourth embodiment of the disconnect knob of the present invention.

Knob 90c according to yet another embodiment of the present invention is illustrated in FIG. 10 and includes chord 182 connected to annular ramp 146c. Annular ramp 146c includes ramped surface 147c operable to displace disconnect pin 98 as described above. Detent 158c is formed in both ramped surface 147c and chord 182 to facilitate retention of disconnect pin 98 therein.

FIG. 5 illustrates an alternative embodiment drive unit according to the present invention. Certain elements are indicated by primed reference numerals to differentiate between the corresponding elements of the embodiments illustrated in FIGS. 1A and 1B, and many of these common elements will not be specifically referred to for the sake of brevity. Input shaft 18' and sun gear 26' of drive unit 15 have a longer axial length of engagement relative to input shaft 18 and sun gear 26 of integrated drive unit 10 or wheel drive unit 13 (see, e.g., FIG. 3). With this in mind, the disconnect mechanism of drive unit 15 must be operable to axially displace input shaft 18' a greater distance relative to the displacement of input shaft 18 to effect disengagement of input shaft 18'. Therefore, disconnect knob 90' includes ramp 146' having pinnacle 154' displaced a greater distance from top portion 118' (of knob 90') relative to the displacement of pinnacle 154 from top portion 118 of disconnect knob 90 (See e.g., FIG. 4). This additional length of pinnacle 154' allows for greater axial displacement of disconnect pin 98' and, consequently, greater axial displacement of input shaft 18'. As illustrated in FIG. 5, pinnacle 154' extends past base 122' of disconnect knob 90'. With this in mind, cover 74' includes annular channel 176 to accommodate a portion of ramp 146' (including pinnacle 154'). Detents 158', 160' function to retain disconnect pin 98 in the engaged, and disengaged positions, respectively.

Notably, the outer dimensions of the disconnect mechanisms in accordance with the present invention are such that the disconnect knob is encircled by the portion of hub 40 extending from cover 74. This arrangement advantageously allows hub 40 to provide protection to knob 90 so that the recessed knob is less likely to be struck or otherwise disrupted by external influences, such as, e.g., airborne rocks or dirt.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A drive unit including a fixed spindle connectable to a vehicle and a rotatable hub connected to a wheel, said drive unit comprising:

a gear set operable to be selectively driven by a power source, the hub selectively operably coupled to said power source through said gear set;

an input shaft for selectively connecting said power source to said gear set, said input shaft selectively axially displaceable from an engaged position in which said input shaft is drivingly engaged with said gear set to a disengaged position in which said input shaft is disengaged from said gear set; and a camming surface rotatably mounted to said drive unit and connected to said input shaft, whereby actuation of said surface operates to axially displace said input shaft between said engaged and said disengaged positions.

2. The drive unit of claim 1, further comprising a disconnect pin, said camming surface connected to said input shaft via said disconnect pin, said disconnect pin having a first end abutting said camming surface and a second end abutting said input shaft.

3. The drive unit of claim 2, further comprising a resilient member engaged with said input shaft, said input shaft, said disconnect pin and said camming surface urged into substantially continuous contact by said resilient member.

4. The drive unit of claim 2, further comprising a removable cover member connected to said hub, said cover substantially sealably enclosing an end of the hub, said disconnect pin traversing an aperture in said cover.

5. The drive unit of claim 1, wherein said power source comprises a hydraulic motor.

6. A drive unit including a fixed spindle connectable to a vehicle and a rotatable hub connected to a wheel, said drive unit comprising:

a gear set operable to be selectively driven by a power source, the hub selectively operably coupled to said power source through said gear set;

an input shaft for selectively connecting said power source to said gear set, said input shaft selectively axially displaceable from an engaged position in which said input shaft is drivingly engaged with said gear set to a disengaged position in which said input shaft is disengaged from said gear set;

a rotatable camming surface connected to said input shaft, whereby actuation of said camming surface operates to axially displace said input shaft between said engaged and said disengaged positions;

a disconnect pin, said camming surface connected to said input shaft via said disconnect pin, said disconnect pin having a first end abutting said camming surface and a second end abutting said input shaft;

a removable cover member connected to said hub, said cover substantially sealably enclosing an end of the hub, said disconnect pin traversing an aperture in said cover; and a disconnect knob rotatably attached to said cover, said camming surface comprising an annular ramped surface integral with said disconnect knob, whereby rotation of said knob actuates said camming surface and axially displaces said input shaft between said engaged and said disengaged positions.

7. The drive unit of claim 6, wherein said knob includes a base overlaying said cover, said base having a seal affixed thereto, said seal abutting said cover.

8. The drive unit of claim 7, wherein said seal is mounted in a seal groove of said base, said seal groove having a plurality of circumferentially arranged ribs therein, each of said ribs exerting a compressive force on said seal to retain said seal in said seal groove, whereby movement of said seal relative to said knob is substantially prevented.

9. The drive unit of claim 6, wherein said knob includes a plurality of peripheral protrusions operable to receive an applied force to rotate said knob.

10. The drive unit of claim 6, wherein said cover is recessed within said hub, and wherein a periphery of said knob is encircled by said hub.

11. A drive unit including a fixed spindle connectable to a vehicle and a rotatable hub connected to a wheel, said drive unit comprising:

a gear set operable to be selectively driven by a power source, the hub selectively operably coupled to said power source through said gear set;

an input shaft for selectively connecting said power source to said gear set, said input shaft selectively axially displaceable from an engaged position in which said input shaft is drivingly engaged with said gear set to a disengaged position in which said input shaft is disengaged from said gear set;

a rotatable camming surface connected to said input shaft, whereby actuation of said camming surface operates to axially displace said input shaft between said engaged and said disengaged positions;

a disconnect pin, said camming surface connected to said input shaft via said disconnect pin, said disconnect pin having a first end abutting said camming surface and a second end abutting said input shaft;

a removable cover member connected to said hub, said cover substantially sealably enclosing an end of the hub; and a disconnect knob rotatably attached to said cover, said camming surface comprising an annular ramped surface integral with said disconnect knob, whereby rotation of said knob actuates said camming surface and axially displaces said input shaft between said engaged and said disengaged positions, said disconnect knob having an engage detent, wherein said disconnect pin is retained within said engage detent when said input shaft is placed in said engaged position, said annular ramped surface having a pinnacle, said disconnect knob having a disengage detent located on said pinnacle, whereby said disconnect pin is retained in said disengage detent when said input shaft is placed in said disengaged position.

12. An integrated drive unit including a fixed spindle connectable to a vehicle and a rotatable hub connected to a wheel, said integrated drive unit comprising:

a hydraulic motor;

a gear set selectively driven by said motor; the hub selectively operably coupled to said motor via an output shaft, said output shaft rotatably fixed to said motor, an input shaft splined to said output shaft, and said gear set; said input shaft selectively axially displaceable from an engaged position in which said input shaft is drivingly engaged with said gear set to a disengaged position in which said input shaft is disengaged from said gear set;

an actuatable camming surface connected via a disconnect pin to said input shaft, whereby actuation of said camming surface operates to axially displace said input shaft between said engaged and said disengaged positions;

a removable cover substantially sealably enclosing an end of the hub, said disconnect pin traversing an aperture in said cover; and a disconnect knob rotatably attached to said cover, said camming surface comprising an annular ramped surface integral with said disconnect knob, whereby rotation of said knob actuates said camming surface and axially displaces said input shaft between said engaged and said disengaged positions.

13. A wheel drive unit including a fixed spindle connectable to a vehicle and a rotatable hub connected to a wheel, said wheel drive unit comprising:

a gear set operable to be selectively driven by a power source, the hub selectively operably coupled to said power source through said gear set and an input shaft, said input shaft selectively axially displaceable from an engaged position in which said input shaft is drivingly engaged with said gear set to a disengaged position in which said input shaft is disengaged from said gear set;

an actuatable ramped surface connected via a disconnect pin to said input shaft, whereby actuation of said ramped surface operates to axially displace said input shaft between said engaged and said disengaged positions;

a removable cover substantially sealably enclosing an end of the hub, said disconnect pin traversing an aperture in said cover; and a disconnect knob rotatably attached to said cover, said ramped surface comprising an annular ramped surface integral with said disconnect knob, whereby rotation of said knob actuates said ramped surface and axially displaces said input shaft between said engaged and said disengaged positions.

14. A method of placing a drive unit in a freewheel position, wherein the drive unit includes a fixed spindle and a rotatable hub connected to a wheel; the drive unit further including a gear set selectively driven by a power source, the hub selectively operably coupled to the power source through the gear set; an input shaft for selectively connecting said power source to said gear set, the input shaft selectively axially displaceable from an engaged position in which said input shaft is drivingly engaged with the gear set to a disengaged position in which the input shaft is disengaged from the gear set; and a camming surface moveably mounted on the drive unit and connected to the input shaft, said method comprising:

manually actuating said camming surface while said camming surface remains mounted on said drive unit; and axially displacing said input shaft to thereby shift said input shaft into one of said engaged and disengaged positions by said manual actuation of said camming surface.

15. A method of placing a drive unit in a freewheel position, wherein the drive unit includes a fixed spindle and a rotatable hub connected to a wheel; the drive unit further including a gear set selectively driven by a power source, the hub selectively operably coupled to the power source through the gear set; an input shaft for selectively connecting said power source to said gear set, the input shaft selectively axially displaceable from an engaged position in which said input shaft is drivingly engaged with the gear set to a disengaged position in which the input shaft is disengaged from the gear set; and a rotatable camming surface connected to the input shaft, said method comprising:

rotating said camming surface; axially displacing said input shaft to thereby shift said input shaft into one of said engaged and disengaged positions; and wherein said drive unit further comprises: a disconnect pin, said ramped surface connected to said input shaft via said disconnect pin; a removable cover member connected to said hub, said cover substantially sealably enclosing an end of the hub, the disconnect pin traversing an aperture in the cover; a disconnect knob rotatably attached to the cover, the rotatable camming surface comprising an annular ramped surface integral with the disconnect knob, whereby rotation of the disconnect knob actuates the ramped surface and axially displaces the input shaft between the engaged and disengaged positions; wherein said step of rotating said camming surface comprises rotating the disconnect knob.

* * * * *

UNITED STATES PATENT AND TRADEMARK OFFICE
CERTIFICATE OF CORRECTION

PATENT NO.     : 6,607,049 B2
DATED          : August 19, 2003
INVENTOR(S)    : Brian P. Cigal It is certified that error appears in the above-identified patent and that said Letters Patent is hereby corrected as shown below:

Column 9,
Line 42, add the word "camming" between "said" and "surface"

Signed and Sealed this

Twenty-first Day of October, 2003

JAMES E. ROGAN
*Director of the United States Patent and Trademark Office*